United States Patent [19]

Takeuchi et al.

[11] Patent Number: 4,594,854
[45] Date of Patent: Jun. 17, 1986

[54] ASSEMBLY OF VACUUM BOOSTER AND MASTER CYLINDER

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Ueda, Japan

[21] Appl. No.: 712,463

[22] Filed: Mar. 15, 1985

Related U.S. Application Data

[63] Continuation of Ser. No. 511,974, Jul. 8, 1983, abandoned, which is a continuation of Ser. No. 269,966, Jun. 3, 1981, abandoned.

[30] Foreign Application Priority Data

Dec. 6, 1980 [JP] Japan .................... 55-172479
Dec. 10, 1980 [JP] Japan .................... 55-176867[U]

[51] Int. Cl.⁴ .................................. B60T 13/00
[52] U.S. Cl. ........................ 60/547.1; 92/128; 92/169; 411/353
[58] Field of Search .......... 60/547.1; 91/369 A, 91/376 R; 92/98 D, 166, 165 PR, 128; 411/353

[56] References Cited

U.S. PATENT DOCUMENTS

| | | | |
|---|---|---|---|
| 3,120,296 | 2/1964 | Randol | 220/18 |
| 3,738,232 | 6/1973 | Kado | 92/161 |
| 3,896,867 | 7/1975 | Gill | 411/353 |
| 4,207,807 | 6/1980 | Takata | 92/159 |
| 4,325,218 | 4/1982 | Weiler | 60/547 R |
| 4,334,459 | 6/1982 | Riedel | 92/166 |
| 4,339,921 | 7/1982 | Schanz | 60/547 R |

FOREIGN PATENT DOCUMENTS

| | | | |
|---|---|---|---|
| 0009393 | 4/1980 | European Pat. Off. | 92/98 D |
| 2031086 | 4/1980 | United Kingdom | 91/369 A |
| 2053395 | 2/1981 | United Kingdom | 91/369 A |

Primary Examiner—Abraham Hershkovitz
Attorney, Agent, or Firm—Armstrong, Nikaido, Marmelstein & Kubovcik

[57] ABSTRACT

An assembly of a vacuum booster device and a master cylinder comprising a booster shell composed of front and rear halves and a brake master cylinder body which are together combined by the aid of tie rods extending through the booster shell, and a booster piston accommodated in the shell so that the load on the booster shell is removed, any means for fastening the opposite edge portions of both the shell halves is eliminated and, accordingly, outside diameter of the shell is decreased without lowering its strength. Furthermore, retaining ring fitted in the tie rod effective in preventing the shell from separation enables both the constructing and separating works of the assembly easier.

2 Claims, 3 Drawing Figures

ASSEMBLY OF VACUUM BOOSTER AND MASTER CYLINDER

This application is a continuation of application Ser. No. 511,974, filed July 8, 1983, now abandoned, which is a continuation of Ser. No. 269,966, filed June 3, 1981, now abandoned.

BACKGROUND OF THE INVENTION

This invention relates to an assembly of a vacuum booster device and a master cylinder to be mainly used for operating automotive hydraulic brakes, clutches or the like.

Conventionally, in the assembly of the above type, a booster shell of the booster device is divided into a front bowl and a rear bowl, opposite edge portions of both the bowls are together fastened by the aid of a fastening means such as bolts or the like with outer peripheral edge of a piston diaphragm inside the booster shell held between both the bowl edge portions, and a cylinder body of the master cylinder is connected to the bowls by bolts. However, since a forward thrust load applied to the master cylinder when the booster device is in operation is supported with the booster shell, the fastening means should be capable enough of bearing the thrust load. Accordingly, as a matter of course, outside diameter of the booster shell, especially of the opposite edge portions of the front and rear bowls, should be obliged to be designed in large size.

SUMMARY OF THE INVENTION

The present invention has been proposed to overcome the difficulties encountered in the prior art as described above and has for its primary object the provision of a new and improved assembly of a vacuum booster device and a master cylinder of the type described wherein both the bowls of the booster shell and the cylinder body of the master cylinder are combined together by means of tie rods extending through the booster piston so as to remove the load on the booster shell and eliminate the means for together fastening the opposite edge portions of both the bowls so that the booster shell can be reduced in its outside diameter without decreasing the strength thereof.

Another object of the present invention is to provide a new and improved assembly of the type described whereby the booster device and the master cylinder can be readily separated or combined for inspection or maintenance.

The above and other objects, features and advantages of the present invention will become apparent from the following description when taken in conjunction with the accompanying drawings, which illustrate a presently preferred embodiment of the invention.

DESCRIPTION OF THE PREFERRED EMBODIMENTS

Embodiments of the present invention will be explained hereinafter with reference to the drawings.

Figure 1:
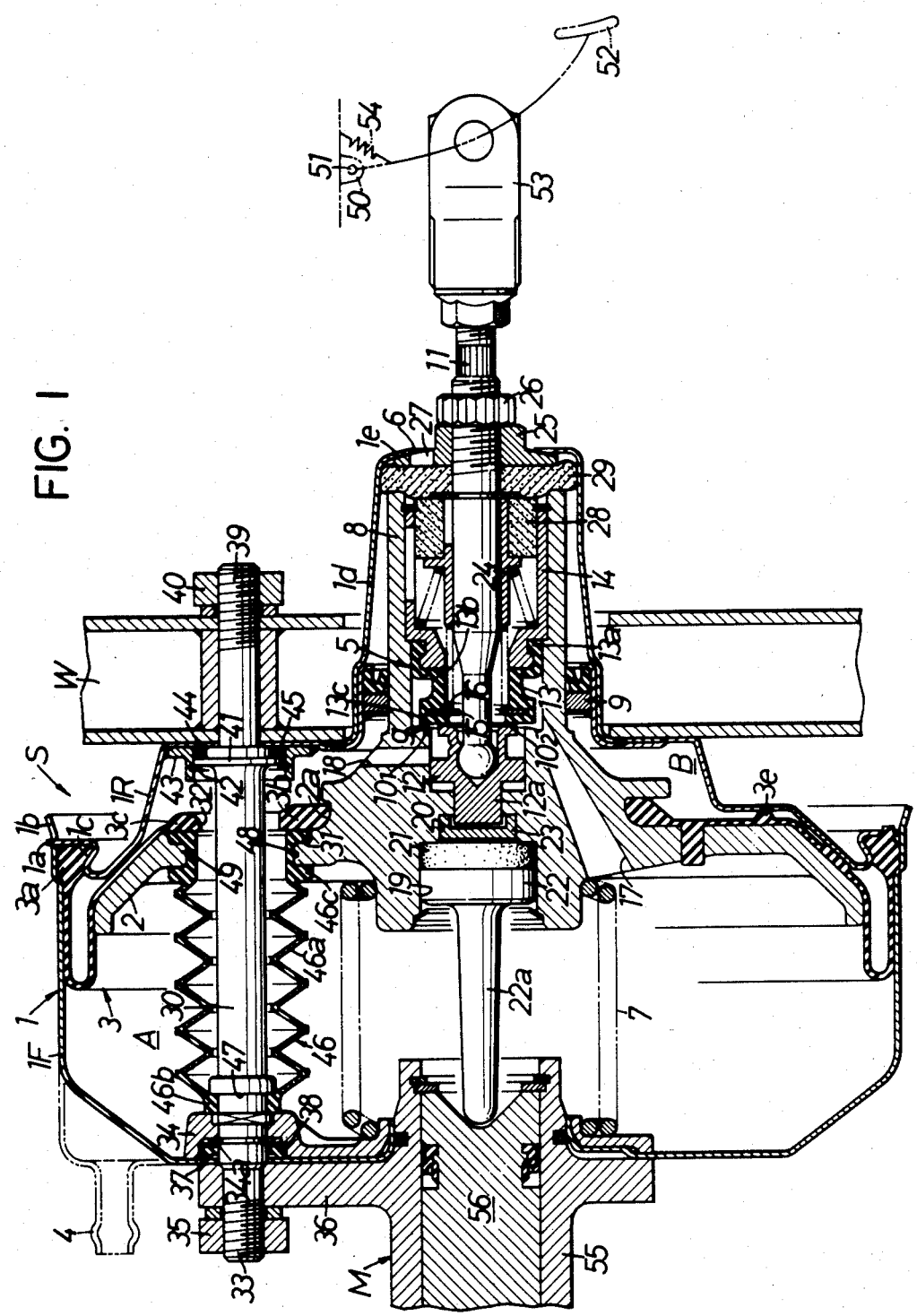
FIG. 1 is a longitudinal cross-sectional side view showing a primary embodiment of the assembly according to the present invention.
Figure 2:
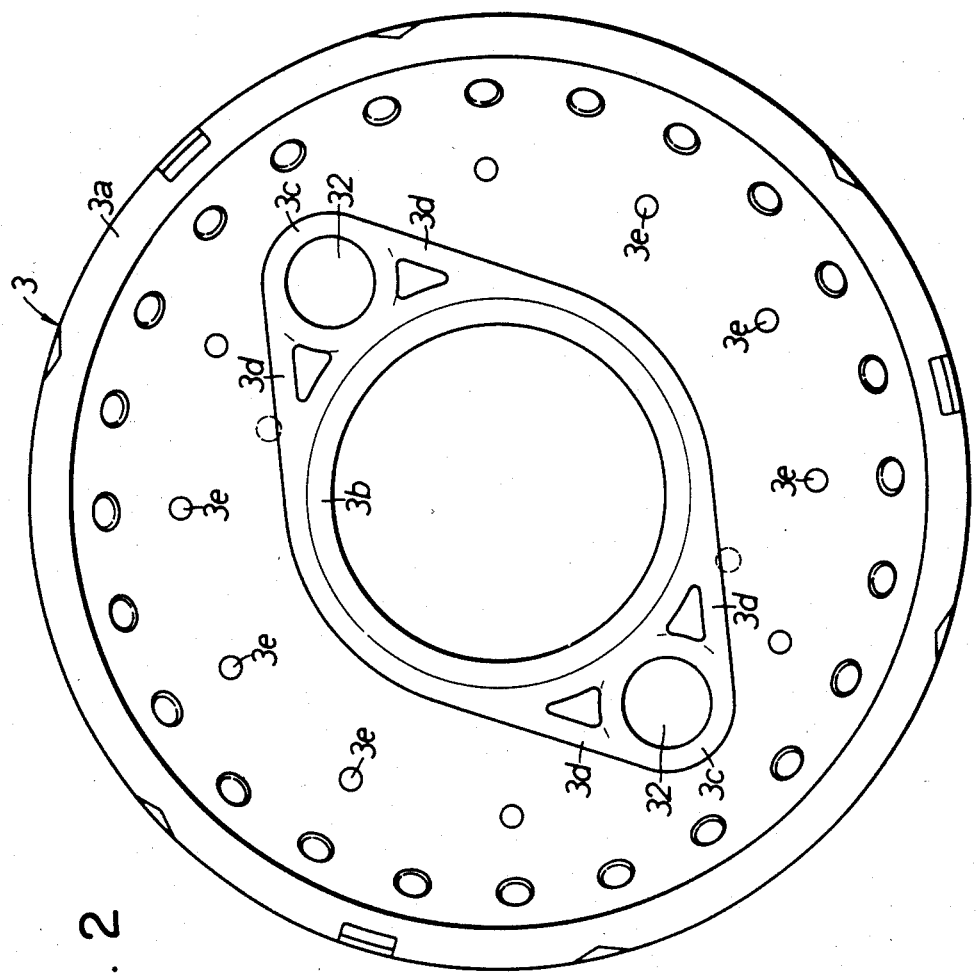
FIG. 2 is a plan view of the piston diaphragm shown in FIG. 1.

The first embodiment of the present invention is shown in FIGS. 1 and 2. In FIG. 1, a vacuum booster device, generally denoted by S, has a booster shell 1 which is composed of a pair of front and rear bowl-like parts 1F and 1R formed of light thin steel plate or synthetic resin. The rear bowl-like part 1R has a plurality of projections 1a formed around an opening of the rear bowl-like part 1R at equal circumferential intervals. The projections 1a are fitted to a plurality of notches 1b formed around an opening of the front bowl-like part 1F at equal circumferential intervals so as to position the bowl-like parts 1F and 1R in place. The parts 1F and 1R are connected together through singular or plural tie-rods 30 extending between their front and rear walls opposed to each other. The connection between the booster shell 1 and tie rods 30 will be described later.

The interior space of the booster shell 1 is divided into a front side first working chamber A and a rear side second working chamber B by a booster piston 2 axially slidably accommodated therein and a piston diaphragm 3 formed of such flexible materials as rubber or the like and joined to the rear face of the booster piston 2.

As shown in FIG. 2, the piston diaphragm 3 is of annular shape as a whole, and has annular beads 3a and 3b integrally formed on outside and inside edges thereof, respectively. The annular beads 3a and 3b are fitted in annular grooves 1c and 2a, respectively, which are formed in a joining portion of both the bowl-like parts 1F and 1R and in a rear face of the booster piston 2, respectively.

The first working chamber A is always held in communication with a vacuum source in the form of an intake manifold, not shown, of an associated internal combustion engine through a vacuum inlet pipe 4, while the second working chamber B is selectively placed in communication with the first working chamber A or an inlet port 6 open to the end wall 1e of a rearward extension tube 1d of the booster shell 1 through a control valve 5 which will be described later.

The booster piston 2 is normally biased rearward, or toward the second working chamber B by a return spring 7 arranged under compression in the first working chamber A. The rearward travel of the booster piston 2 under the spring bias is limited by projections 3e formed on the rear face of the piston diaphragm 3 being in abutting engagement with the rear inside wall of the booster shell 1.

The booster piston 2 and the piston diaphragm 3 are respectively provided with through holes 31 and 32 for passing the tie-rods 30 therethrough. The through hole 32 is open to the front face of the piston diaphragm 3 separable from the booster piston 2.

As shown in FIG. 2, an annular bead 3c is integrally formed around a peripheral edge of the through hole 32, and at least two straight beads 3d and 3d for connecting annular beads 3b and 3c in almost parallel with common tangents to the beads 3b and 3c are formed on one side (rear side in the figure) of the piston diaphragm 3. The beads 3b, 3c, 3d together contribute to the increase of tensile rigidity of the piston diaphragm 3.

A tubular valve casing 8 integrally formed with the booster piston 2 and extending axially rearwardly from the central rear face thereof is slidably supported by a plain bearing 9 disposed in the extension tube 1d and the rear end of the casing 8 is open to the air inlet port 6.

The control valve 5 is constructed in the tubular valve casing 8 as follows: An annular first valve seat $10_1$ is formed on the inside of the front wall of the tubular valve casing 8; a valve piston 12 connected to an input rod 11 to form the fore end of the latter is slidably fitted in the front part of the valve casing 8; and an annular second valve seat $10_2$ encircled by the first valve seat $10_1$ is formed at the rear end of the valve piston 12.

A cylindrical valve element 13 with its both ends opened is held at its base end portion 13a between the inside wall of the valve casing 8 and the outer periphery of a valve retainer sleeve 14 fitted inside the valve casing 8. The valve element 13 is formed of elastic materials such as rubbers or the like, and has a thin diaphragm 13b radially inwardly extending from the base end portion 13a, and a thick valve portion 13c formed at the inner end of the diaphragm 13b and opposed to the first and second valve seats $10_1$ and $10_2$. The valve portion 13c is axially movable owing to the deformation of the diaphragm 13b and capable of abutting against the front end surface of the valve retainer sleeve 14.

An annular reinforcing plate 15 is inlaid in the valve portion 13c and is worked by a valve spring 16 for biasing the valve portion 13c toward both the valve seats $10_1$ and $10_2$.

A radially outside space of the first valve seat $10_1$, a middle space between the first and second valve seats $10_1$, $10_2$, and a radially inside space of the second valve seat $10_2$ are always in communication with the first working chamber A, the second working chamber B and the air inlet port 6, respectively, through a through hole 17 formed in the booster piston 2, another through hole 18 and an interior of the valve element 13, respectively.

The booster piston 2 is provided with a large hole 19 opened in the central front surface thereof and a small hole 20 opened at the recessed end of the large hole 19. An elastic piston 21 made of rubber or the like and an output piston 22 of the same diameter as that of the former are slidably fitted in the large hole 19 in order from the recessed end thereof while a reaction piston 23 of a smaller diameter than that of the elastic piston 21 is slidably fitted in the small hole 20. A small shaft 12a projected from the front end surface of the valve piston 12 is protruded into the small hole 20 and opposed to the rear end surface of the reaction piston 23. The output piston 22 is integrally formed with a forwardly projected output rod 22a.

The input rod 11 is normally biased rearward by a return spring 24 and the rearward travel thereof is limited by abutting engagement of a movable stopper plate 25 screw-fitted to the input rod 11 with the inside of the end wall 1e of the rearward extension tube 1d. The axial location of the input rod 11 is changed by turning the screw-fitted movable stopper plate 25 so that the retracting limit of the input rod 11 can be adjusted both forward and rearward. The movable stopper plate 25 is fixed after the adjustment by tightening a lock nut 26 also screw-fitted to the input rod 11. The movable stopper plate 25 is provided with an air vent 27 for preventing the blocking of the air inlet port 6.

Air filter elements 28 and 29 are fitted in the outer end opening of the tubular valve casing 8 for purifying the air induced through the air inlet port 6 and transformable in order not to prevent the operation of the input rod 11.

The mechanism for connection of the tie rods 30 and the booster shell 1 will next be described.

The tie rod 30 is integrally formed with a mounting bolt 33 which extends through and is forwardly protruded from the front wall of the booster shell 1, and a spring retainer plate 34 is closely fitted to the front inside wall of the booster shell 1. The tie rod 30, the spring retainer plate 34 and the front wall of the booster shell 1 are integrally connected with a mounting flange 36 of the brake master cylinder M placed on the front surface of the booster shell 1 by fastening a nut 35 screwed in the tip end of the mounting bolt 33 passed through the mounting flange 36. On this occasion, an annular sealing material 38 is filled in an annular groove 37 encircling the bolt 33 and formed in the front surface of the spring retainer plate 34 and is airtightly brought into contact with the bolt 33, the spring retainer plate 34 and the front inside wall of the booster shell 1. With this arrangement, leakage of negative pressure through the two paths, between the front inside wall of the booster shell 1 and the spring retainer plate 34 and between the spring retainer plate 34 and the bolt 33, can be prevented by the use of the single annular sealing material 38. The fixed end of the return spring 7 is supported by the spring retainer plate 34 so that resilient force of the return spring 7 is loaded onto the tie rod 30 to eliminate the loading on the booster shell 1. When the edge portions of the bowl-like parts 1F and 1R are fitted to each other, the spring retainer plate 34 is fixed to the front end part of the tie rod 30 by means of a retaining ring 34a to thereby support the front inside wall of the front bowl-like part 1F so that axial location of the front bowl-like part 1F is limited.

Furthermore, the tie rod 30 is integrally formed with a mounting bolt 39 which extends through and is rearwardly protruded from the rear wall of the booster shell 1 and a stepped flange 41 for abutting against the rear inside wall of the booster shell 1. The stepped flange 41 is fitted in a support cylinder 43 welded to the rear inside wall of the booster shell 1 and, by setting a retaining ring 42 in the support cylinder 43, the tie rod 30 and the rear wall of the booster shell 1 are connected together. On this occasion, an annular sealing material 45 is filled in an annular groove 44 between the smaller step of the stepped flange 41 and the support cylinder 43.

In this way, the front and rear bowl-like parts 1F, 1R and the mounting flange 36 are connected together at once constructing an assembly of the vacuum booster device S and the master cylinder M so that the fastening means for holding the outer peripheral bead 3a of the piston diaphragm 3 between the opposite edge portions of both the bowl-like parts 1F and 1R becomes unnecessary any more.

The tie rod 30 is fixed to the front wall W of the compartment by securely screwing a nut 40 to the tip end of the mounting bolt 39 extending through the front wall W of the automobile compartment. The assembly of the booster device S and the master cylinder M is accordingly mounted on the front wall W of the compartment through the tie rods 30.

A sealing means is arranged between the tie rod 30 and a through hole 31 formed in the booster piston 2 for passing the tie rod 30 therethrough in such a manner as not to prevent the operation of the booster piston 2. The sealing means comprises a flexible bellows 46 made of elastic material such as rubber or the like. The outer periphery of the tie rod 30 is surrounded by a tubular part 46a of the bellows 46, and a front end 46b of the bellows 46 is fitted in an annular groove 47 formed on the outer periphery of the tie rod 30 while a rear end 46c of the bellows 46 is fixed to the booster piston 2 by fitting an annular groove 48 formed on the outer periphery of the bellows 46 to an annular projection 49 formed on the inner periphery of the through hole 31. The through hole 32 is sealed by closely but separably mating the rear end 46c of the bellows 46 with a portion surrounding the through hole 32 and formed in the front face of the piston diaphragm 3. A clearance between the rear end 46c and the diaphragm 3 is produced by the pressure difference only when the air pressure of the first working chamber A exceeds that of the second working chamber B.

Inside the compartment, a brake pedal 52 pivoted at 51 by the fixed bracket 50 is connected to the rear end of the input rod 11 of the booster device S through an adjustable pedal link 53. Reference number 54 indicates a return spring for rearwardly biasing the brake pedal 52.

The rear end of the cylinder body 55 of the brake master cylinder M is protruded into the first working chamber A through the front wall of the booster shell 1 and the output rod 22a of the booster device S is opposed to the rear end of a working piston 56 inside the cylinder body 55.

Description will next be made of the operation of the embodiment described heretofore.

The drawings show the booster device S not in operation wherein the valve piston 12, input rod 11 and brake pedal 52, which are connected together, are held at a prescribed retracted position with the force of a return spring 24 at which a movable stopper plate 25 is abutted on the fixed end wall 1e. Front face of the valve portion 13c is pushed by the value piston 12 through the second valve seat $10_2$ and retracted until slightly touched on the front face of the valve retainer sleeve 14, so that a small gap g is made between the first valve seat $10_1$ and the valve portion 13c. The above condition can easily be obtained by adjusting the movable stopper plate 25.

Thus, while the engine is in operation, the first working chamber A is always held at vacuum pressure and in communication with the second working chamber B through the through hole 17, the gap g and the through hole 18. The front opening of the valve portion 13c is closed by the second valve seat $10_2$ so that the vacuum pressure in the first working chamber A is transferred to the second working chamber B to equalize the air pressures in both the working chambers A and B. Accordingly, the booster piston 2 is also located at the retracted position as indicated in the drawings under the bias of the return spring 7.

In the brake operation, when the brake pedal 52 is depressed and the input rod 11 and the valve piston 12 are advanced, the valve portion 13c forwardly biased by the valve spring 16 is also advanced following the valve piston 12, however, since the gap g between the first valve seat $10_1$ and the valve portion 13c is extremely small as aforementioned, the valve portion 13c is seated on the first valve seat $10_1$ without delay to cut off the communication between both the working chambers A and B and, at the same time, the second valve seat $10_2$ is separated from the valve portion 13c to place the second working chamber B into connunication with the air inlet port 6 through the through hole 18 and the inside of the valve element 13. Thus the atmospheric air is induced into the second working chamber B without delay whereby the internal pressure of the chamber B becomes higher than that of the first working chamber A. Owing to the above pressure difference between both the chambers A and B, a forward pressing force is applied to the piston diaphragm 3 and thereby the booster piston 2 is moved forward against the return spring 7 to advance the output rod 22a through the elastic piston 21 so that the working piston 56 of the brake master cylinder M is driven forward and the brake is applied to the vehicle.

When the working piston 56 is driven by the advancing operation of the output rod 22a, the forward thrust load is applied to the cylinder body 55 as referred to above and is transmitted therefrom to the vehicle body, that is, the front wall W of the compartment through the tie rod 30 and supported by the wall. The load is, therefore, not applied to the booster shell 1.

On the other hand, when the small shaft 12a of the valve piston 12 is advanced and abutted against the elastic piston 21 through the reaction piston 23, the reaction force of the output rod 22a is partly fed back to the side of the brake pedal 52 through the valve piston 12 owing to the expansion of the elastic piston 21 toward the reaction piston 23 caused by the reaction force of the output rod 22a, so that the output of the output rod 22a, or the braking force, can be detected by drivers.

Subsequently, when the depression on the brake pedal 52 is released, the input rod 11 is first retracted under the reaction force acting on the valve piston 12 and the resilient force of the return spring 24, thereby the second valve seat $10_2$ is seated on the valve portion 13c, which is abutted on the front face of the valve retainer sleeve 14, so that the axial compressive deformation is produced in the valve portion 13c under the retractive force from the input rod 11. In consequence, a gap larger than the initial one is made between the first valve seat $10_1$ and the valve portion 13c to quickly obtain equilibrium between the air pressures in both the working chambers A and B. When the above pressure difference is disappeared, the booster piston 2 is retracted under the bias of the return spring 7 and a projection 3e is abutted against the rear inside wall of the booster shell 1 and stopped. When the input rod 11 is abutted against the end wall 1e, the valve portion 13c is released from the retractive force of the input rod 11 to be restored to its original form so that the gap between the first valve seat $10_1$ and the valve portion 13c can again be reduced to be the smaller one.

If the brake pedal 52 is depressed and the booster piston 2 is advanced when the vacuum pressure is not accumulated in the first working chamber A, the air in the first working chamber A is not sufficiently discharged into the vacuum source due to the resistance inside the pipe line or the like, so that the remaining air inside the first working chamber A is compressed. When air pressure of the second working chamber B is exceeded by that of the first working chamber A, a portion of the remaining air inside the first working chamber A enters a space between the rear surface of the booster piston 2 and the front surface of the piston diaphragm 3. Therefore, front surface portions of the piston diaphragm 3 surrounding the through hole 32 is separated from the rear end 46c of the bellows 46 to produce a clearance between the diaphragm 3 and the rear end 46c so that both the working chambers A and B are placed in communication with each other through the above clearance and the through hole 32 in the piston diaphragm 3. Thus, such troubles as rearwardly swelling transformation of the piston diaphragm 3 caused by excessive rearward pressing forces acting thereon can be prevented since the air pressures within both the working chambers A and B become balanced with each other without delay through the clearance and the through hole 32.

When the above pressure difference is eliminated, the front face of the piston diaphragm 3 is again placed into close contact with the rear end 46c of the flexible bellows 46.

Figure 3:
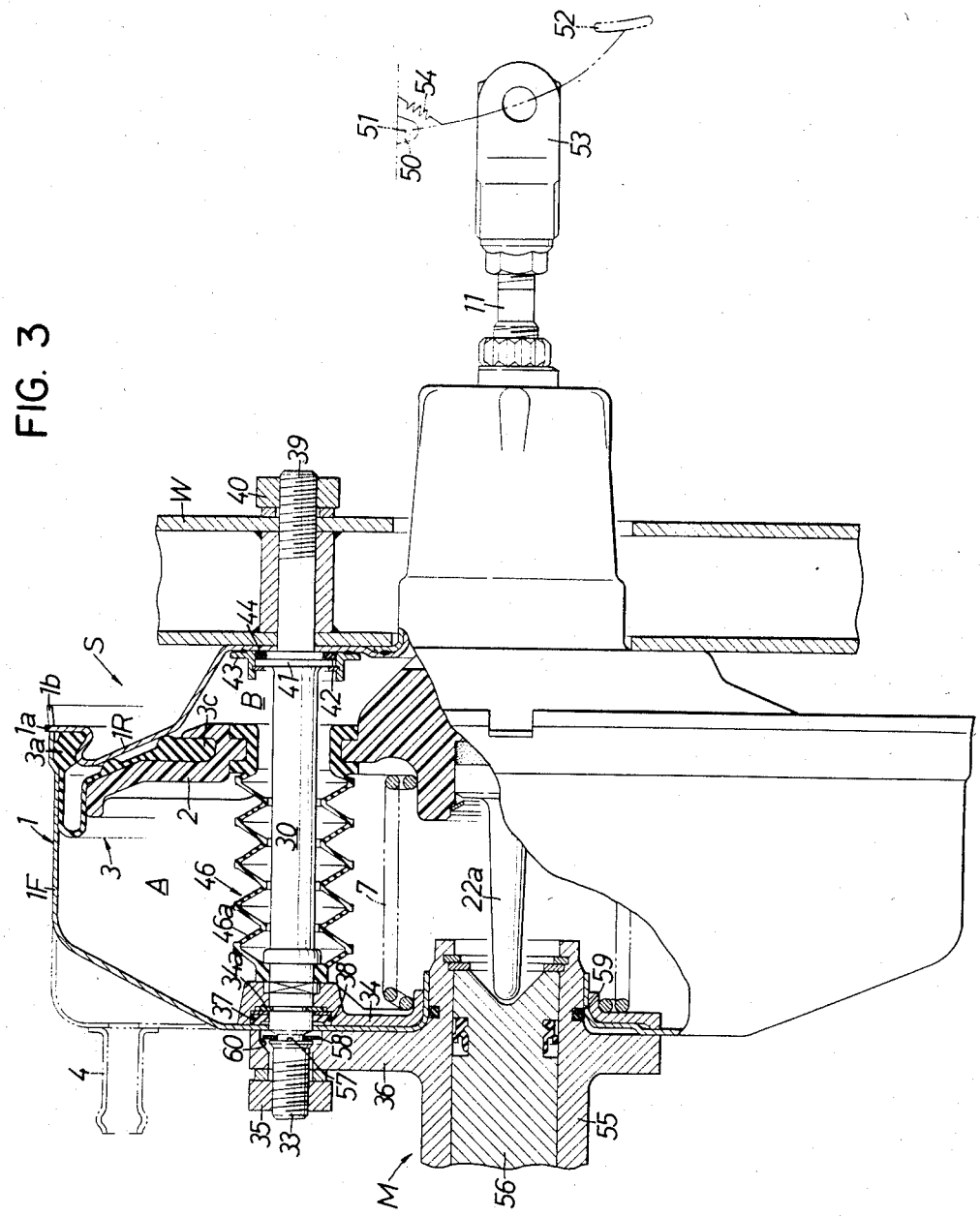
FIG. 3 is a longitudinal cross-sectional side view showing an essential part of the assembly according to the present invention.

The second embodiment of the present invention is shown in FIG. 3. In FIG. 3, a retaining ring 58 such as E-ring or the like to be used for preventing the front bowl-like part 1F from forwardly slipping out is fitted in an annular groove 57 formed adjacent to the front bowl-like part 1F and on the outer periphery of that portion of the tie rod 30 which is protruded forward beyond the part 1F. Therefore, the front bowl-like part 1F is never separated together with the cylinder body 55 regardless of the frictional force of the sealing material 59 in separating the master cylinder M from the booster device S.

An annular recess 60 for accepting the retaining ring 58 is formed on the rear end surface of the mounting flange 36 so as to obtain a reasonable adaptation of the mounting flange 36 of the master cylinder M to the front bowl-like part 1F without any interference of the retaining ring 58.

The structure and operation of this embodiment except the aboves are almost the same as those of the first embodiment and, accordingly, the same symbols have been used for the corresponding members in both the embodiments.

As has been described above, according to the present invention, there has been proposed an assembly of a booster device S and a master cylinder M wherein the booster device S has a booster shell 1 composed of front and rear bowl-like parts 1F and 1R, the outer peripheral edge of a piston diaphragm 3 being held between opposite edge portions of both the bowl-like parts, a cylinder body of the master cylinder M being mounted on the front face of the front bowl-like part 1F, the front and rear bowl-like parts 1F, 1R and the cylinder body 55 being combined together through tie rods 30 extending through a booster piston 2, and any means for connecting the opposite edge portions of the bowl-like parts with each other being eliminated. Therefore, when the booster device S is operated, forward thrust load acting on the cylinder body 55 of the master cylinder M is applied to the tie rods 30 and not to the booster shell 1 so that the booster shell 1 can be formed thin-walled and light-weighted. Additionally, the opposite edge portions of the bowl-like parts 1F, 1R of the booster shell 1 can be formed in a simple structure only enough to hold the piston diaphragm 3 therebetween, as a consequence of which the booster shell has a diameter smaller than those of the conventional ones to enable the assembly to be advantageously arranged in a narrow space.

Further, according to the invention, one end of the tie rod 30 is fixed to the rear bowl-like part 1R while a retaining ring 58 opposing to the front face of the front bowl-like part 1F is engaged with the tie rod 30 in an annular recess 60, which is formed on a surface of the mounting flange 36 abutted on the front bowl-like part 1F, so that when the booster device S and the master cylinder M are separated from each other for inspection or maintenance, the front bowl-like part 1F can be held on the rod 30 by means of the retaining ring 58 to prevent the booster shell from being taken apart to pieces. Accordingly, the works of separating the booster device S from the master cylinder M and thereafter constructing them again into an assembly can be simplified and, in the assembling work, the front bowl-like part 1F can be properly and smoothly fitted to the mounting flange 36 by the aid of the retaining ring 58.

While an embodiment of the present invention has been shown and described, it will be apparent to those skilled in the art that various changes and modifications may be made therein without departing from the spirit of the invention or the scope of the appended claims.

What is claimed is:

1. In a assembly of a vacuum booster device and a master cylinder comprising a booster shell divided into a front bowl and rear bowl, a booster piston and a piston diaphragm accommodated in the booster shell, said piston diaphragm being fixed at its inner peripheral edge to said booster piston and at its outer peripheral edge being held between opposite edge portions of said front and rear bowls, a return spring arranged between said front bowl and said booster piston, a cylinder body provided on the front surface of said front bowl, and a working piston slidably fitted in said cylinder body and operatively associated with said booster piston; the improvement wherein said cylinder body includes a mounting flange adjacent said front surface of said front bowl; said front and rear bowls and mounting flange are connected together by tie rods extending through said booster piston so that any means for fastening said opposite edge portions of both of said front and rear bowls is eliminated; said tie rods extend through both of said bowls, said booster piston and said mounting flange, ne end of each said tie rod being fixedly fastened to said rear bowl while the other end thereof being tightened against said mounting flange and said front bowl with a nut screwed on said tie rod and a snap ring of thin sheet material is clipped into a reduced diameter portion of said tie rod and is opposed to the front face of said front bowl to retain said front and rear bowls assembled when said nut and said mounting flange are removed from said tie rod, said snap ring being housed in an annular recess surrounding said tie rod and in the surface of said mounting flange when said mounting flange is abutted on the front face of said front bowl by said nut so as to cause no interferences between the surfaces of said mounting flange and said front bowl when said mounting flange and said front bowl are assembled and being exposed on the front face of said bowl for removal from said tie rod when said nut and said flange are removed from said tie rod.

2. An assembly as set forth in claim 1, wherein said snap ring comprises an E-shaped snap ring.

* * * * *